US 7,080,821 B1

(12) United States Patent
Su

(10) Patent No.: US 7,080,821 B1
(45) Date of Patent: Jul. 25, 2006

(54) VALVE WITH A STRUCTURE LIMITING THE TURNING ANGLE OF THE VALVE KNOB

(76) Inventor: Li-Chin Su, No. 222, Lane 384, Sec. 3, Jhangcao Rd., Hemei Township, Changhua County (TW)

( * ) Notice: Subject to any disclaimer, the term of this patent is extended or adjusted under 35 U.S.C. 154(b) by 0 days.

(21) Appl. No.: 10/962,230

(22) Filed: Oct. 12, 2004

(51) Int. Cl.
*F16K 51/00* (2006.01)

(52) U.S. Cl. .................................................. 251/288

(58) Field of Classification Search ................ 251/287, 251/288
See application file for complete search history.

(56) References Cited

U.S. PATENT DOCUMENTS 4,073,314 A * 2/1978 Speelman et al. ..... 137/625.47
4,218,042 A * 8/1980 Eckel .......................... 251/288
6,382,590 B1 * 5/2002 Wu ............................. 251/286

* cited by examiner

*Primary Examiner*—Edward K. Look
*Assistant Examiner*—John K. Fristoe, Jr.
(74) *Attorney, Agent, or Firm*—Egbert Law Offices

(57) ABSTRACT

A valve with a structure limiting of the turning angle of the valve knob includes a valve and knob installed on the valve. The valve contains a raised tube, which contains a globe valve brake axle protruding in the center; and the knob contains a connecting groove which can be affixed to the top of the globe valve brake axle. One side of the raised tube of the valve forms a section of fillister plane along the circumference, and two crosswise ends of the fillister plane form first and second blades vertically. The bottom of the connecting groove of the knob forms an expanded groove, and one side of the fillister plane forms an inner protrusion. The structure of the turning angle of the knob is completed concealed inside the knob.

2 Claims, 6 Drawing Sheets

VALVE WITH A STRUCTURE LIMITING THE TURNING ANGLE OF THE VALVE KNOB

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a valve structure, and more particularly to an improved limit structure for the turning angle of valve knob.

BACKGROUND OF THE INVENTION

Most valves for pipes must be installed with a knob for users to control the on and off state of the globe valve flow inside the valve. Since the inside globe valve differentiates the on and off state of the flow by turning in a 90° angle, an angular limit structure must be installed at the pivot of the outside knob and valve to control the position accurately. The present invention intends to improve the angular limit structure of the knob. The traditional structure is comprised of a protrusion installed on the outside of the raised tube for the knob, which is normally in the shape of long rectangular board and which connector is locked to the top of protruding axle of a globe valve in the center of the raised tube with a bolt. One side of the knob connector forms a protrusion of two angles. As the knob is turned clockwise and counterclockwise, different parts of the side protrusion work to push against the protrusion formed by the raised tube of the knob for limit and positioning. Therefore, the traditional design has problems.

1. Since the protrusions of the raised tube and of the knob connector are exposed, the uneven surface of the connector of the knob and valve is lack of appealing appearance and is prone to deposit of dust.

2. Since the protrusion of the knob pushes against the valve protrusion on the outside, it often causes injury to users' hands and leads to safety problems.

Given the abovementioned problems to the limit structure of the turning angle of the valve knob, improvement on a more practical design is to be achieved.

Therefore, based the personal manufacturing, design, and R&D experience of the inventor in the field, an invention with practicality is introduced.

BRIEF SUMMARY OF THE INVENTION

The improvements are as follows:

1. It provides a valve raised tube with a section of fillister plane, which two ends form first and second blades vertically; the bottom of the knob connecting groove forms an expanded groove, and the inside contains an inner protrusion for innovated design.

2. The improved design provides the limit structure for the turning angle of the knob to conceal the inner protrusion, the first and second blades of the fillister plane inside the knob so that the outside of the valve and knob has an appealing appearance.

3. Since the uneven limit structure of the knob is hidden inside, it can prevent deposit of dust and keep the outside easy to clean.

4. Since the limit structure of the turning angle of the knob is hidden inside, it can prevent hand injury as in traditional structure for added safety features.

The above is description of the preferred embodiment of the present invention. However, modification in compliance with the essence and spirit of the present invention by experts is welcomed, and the said modification shall be covered in the following claims.

DETAILED DESCRIPTION OF THE INVENTION

Figure 1:
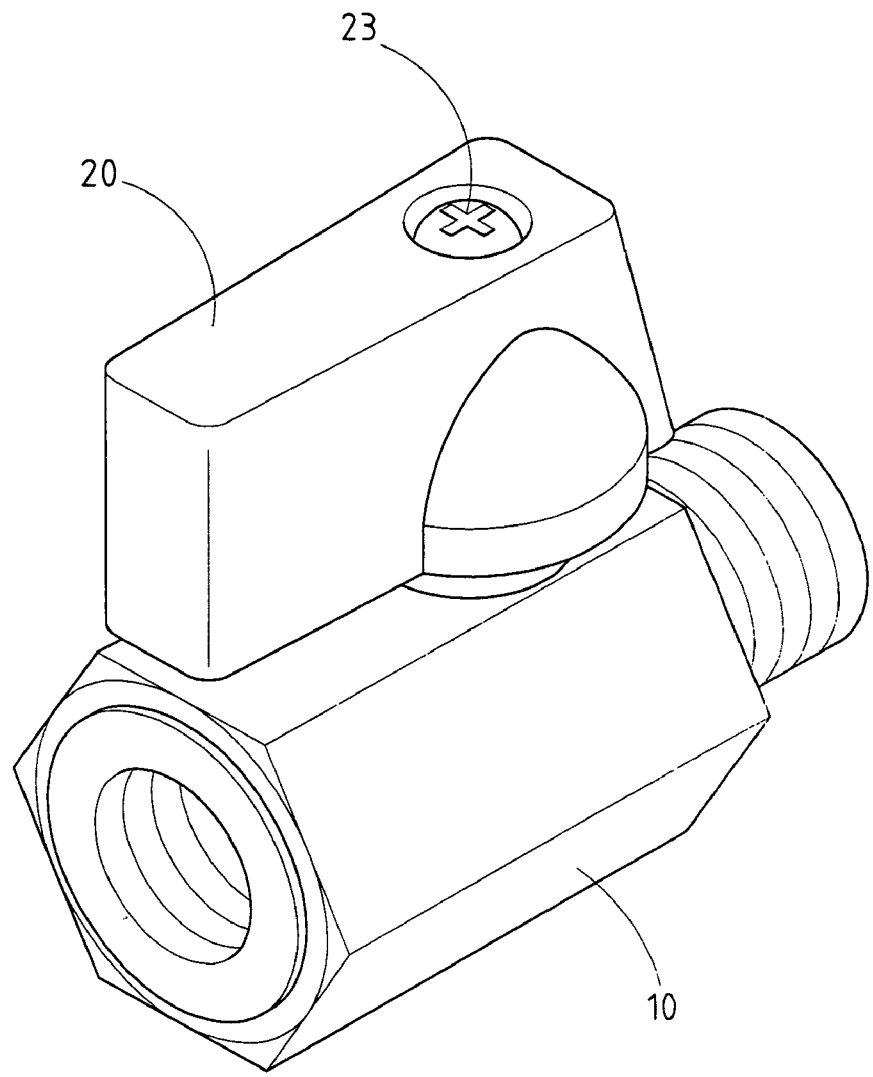
FIG. 1 shows a perspective view of the preferred embodiment of the present invention.
Figure 2:
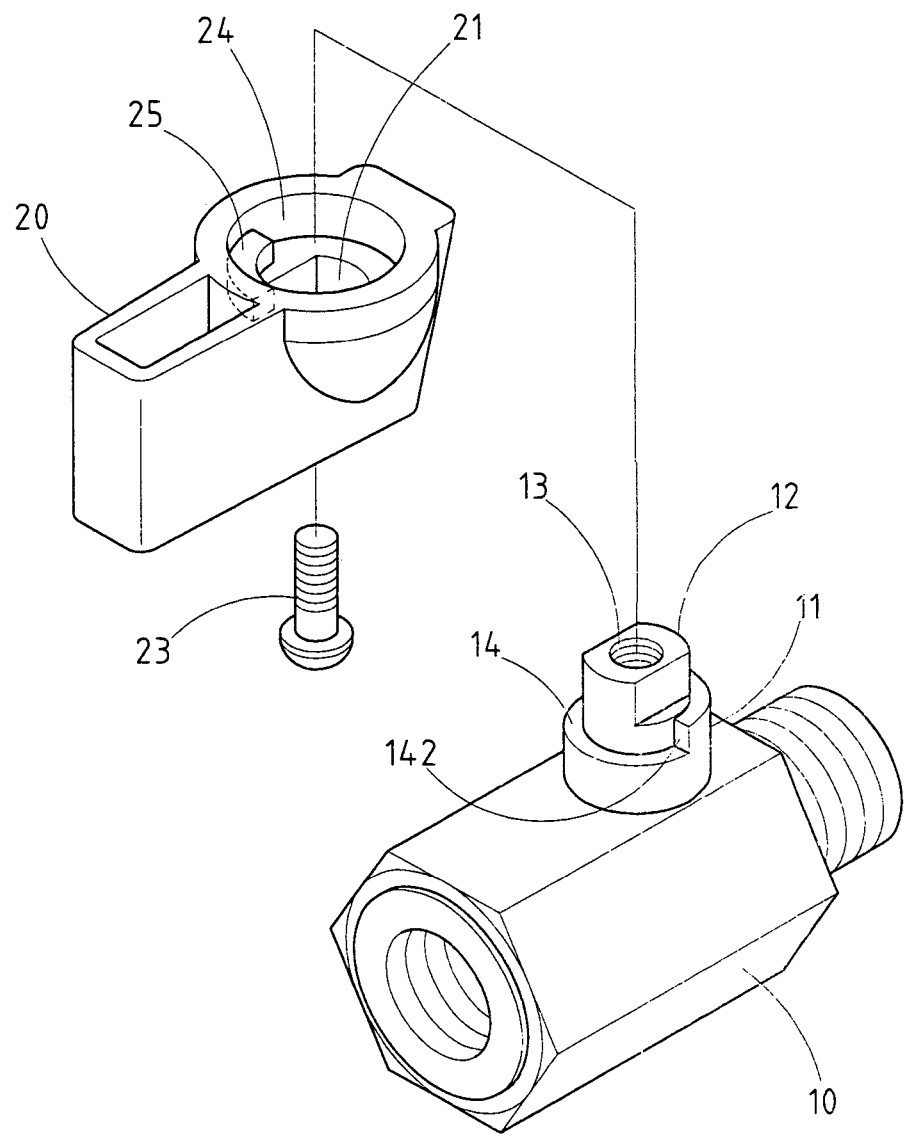
FIG. 2 shows an exploded perspective view of the present invention.
Figure 3:
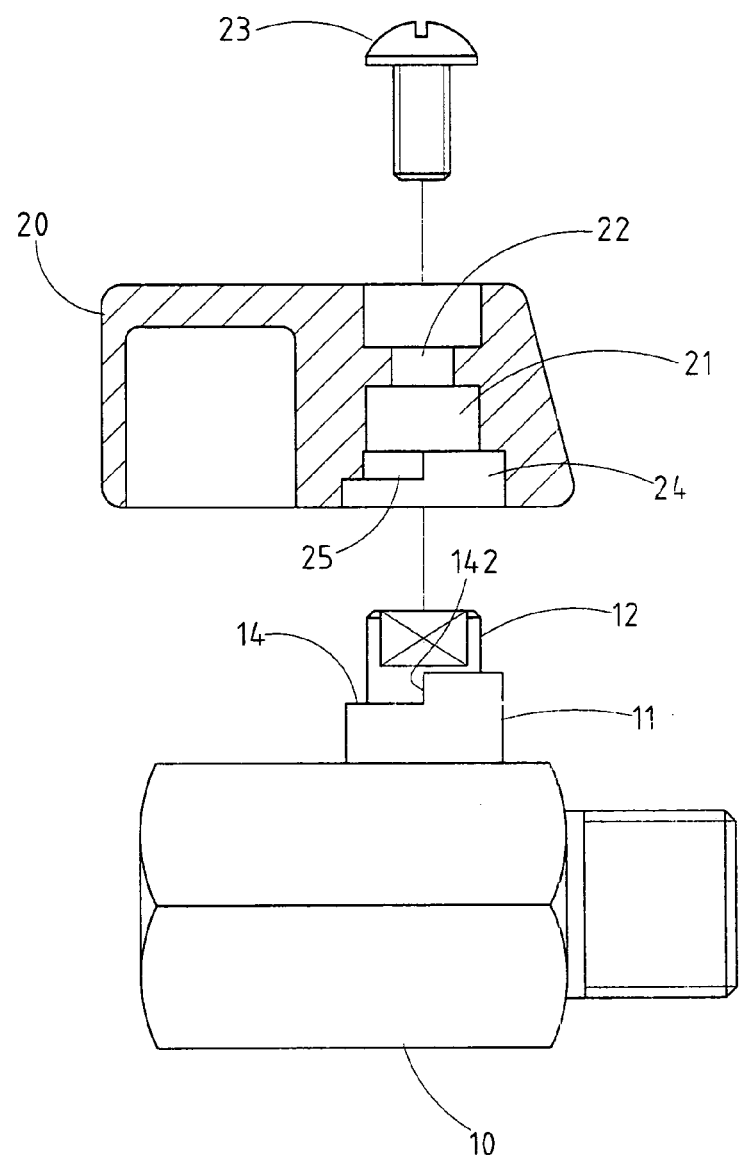
FIG. 3 shows an exploded sectional view of the present invention.
Figure 4:
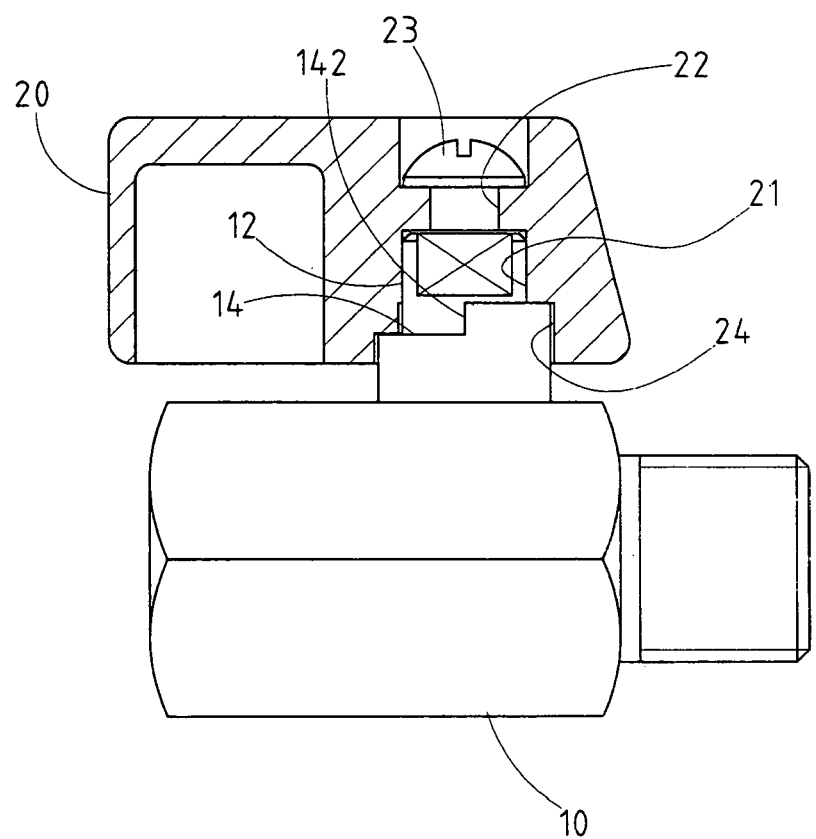
FIG. 4 shows another sectional view of the installed invention.

The features and the advantages of the present invention will be more readily understood upon a thoughtful deliberation of the following detailed description of a preferred embodiment of the present invention with reference to the accompanying drawings.

As shown in FIGS. 1–4, an improved limit structure for the turning angle of the valve knob embodied in the present invention comprises a valve 10 and a valve knob installed upon 20; whereas the valve 10 contains a raised tube 11, which contains a globe valve brake axle 12 protruding from the center of the raised tube; the knob 20 contains a connecting groove 21, which is installed on the top of the said globe valve brake axle 12; the top of the said globe valve brake axle 12 is a non-circular cross-section (such as the leveled section formed on the two sides of the rod), the shape of the connecting groove 21 of the knob 20 matches for positioning; the top of the connecting groove 21 contains a through hole 22, which could be locked to the screw hole 13 of the top of globe valve brake axle 12 through a bolt 23. Turning the knob 20 can drive the rotation of the globe valve brake axle 12 in order to control the on and off state of the flow control.

The features of the present invention include one side of the raised tube 11 of the valve 10 following the circumference to form a section of fillister plane 14, and the first blade 141 and second blade 142 on the two crosswise ends of the fillister plane.

Figure 5:
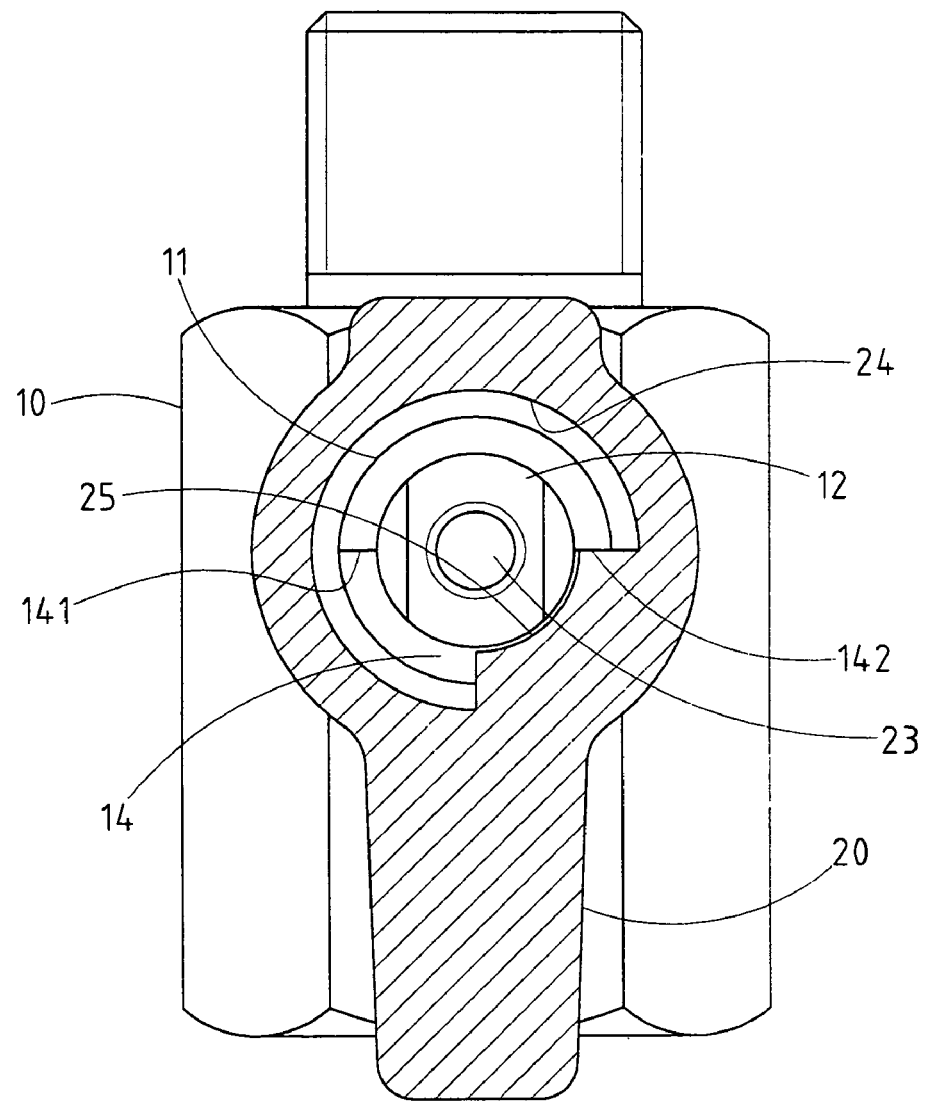
FIGS. 5–6 show top sectional views of the operation of the knob.
Figure 6:
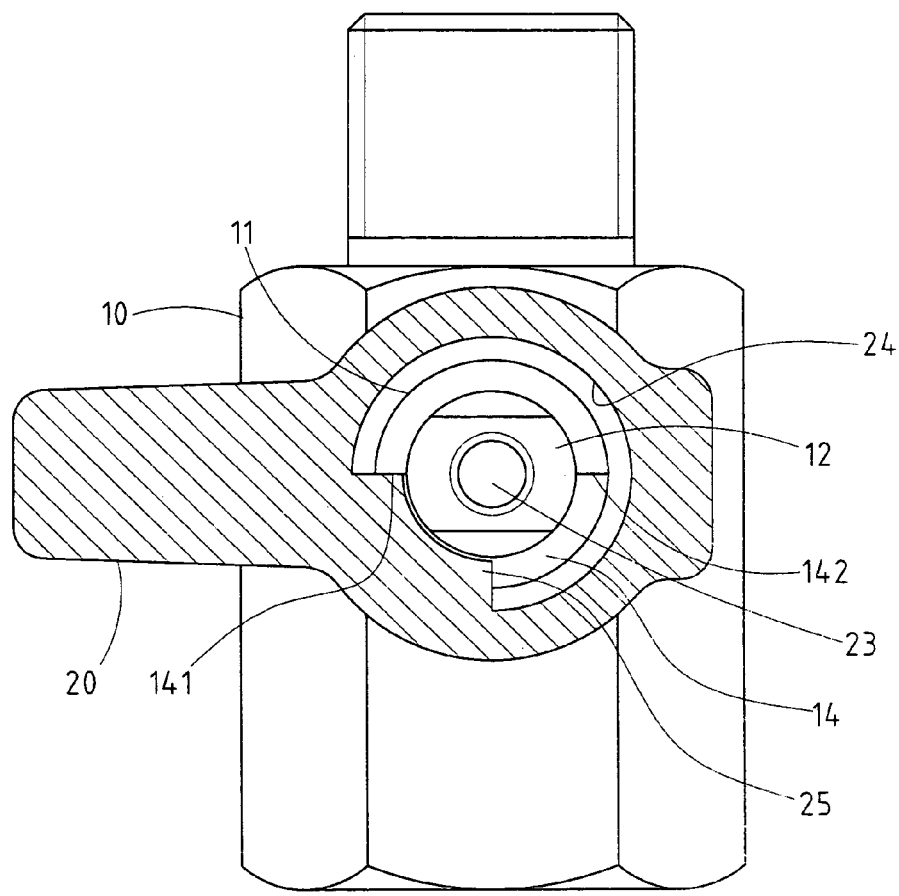

There is the bottom of the connecting groove 21 of the knob 20 forming an expanded groove 24, which can conceal the first and second blades 141 142 and the fillister plane 14 when the globe valve brake axle 12 of the raised tube 11 of the valve 10 is affixed to the knob 20. Also, one side of the fillister plane 14 corresponding to the expanded groove 24 forms an inner protrusion 25, which pushes against the first and second blades 141 142 of the fillister plane 14 when the knob 20 is in on and off angles (see FIGS. 5 and 6) for positioning effect.

the bottom of the connecting groove 21 of the knob 20 forms an expanded groove 24, which can conceal the first and second blades 141 142 and the fillister plane 14 when the globe valve brake axle 12 of the raised tube 11 of the valve 10 is affixed to the knob 20. Also, one side of the fillister plane 14 corresponding to the expanded groove 24 forms an inner protrusion 25, which pushes against the first and second blades 141 142 of the fillister plane 14 when the knob 20 is in on and off angles (see FIGS. 5 and 6) for positioning effect.

The said structure and design can conceal the limit structure of the knob 20, including the inner protrusion 25, the first and second blades 141 142 of the fillister plane 14 inside the knob 20.

Whereas, the first blade 141 and the second blade 142 are forming 180° angle; so that the circumference length of the inner protrusion 25 of the expanded groove 24 of the knob 20 is in 90° angle.

I claim:

1. A valve apparatus comprising:

a valve body;

a raised tube extending upwardly from said valve body, said raised tube having a brake axle extending upwardly from a center of said raised tube, said brake axle having a diameter less than a diameter of said raised tube, said raised tube having a horizontal fillister plane extending inwardly from a periphery of said raised tube toward said brake axle, said raised tube having an abutment section extending upwardly from said fillister plane so as to define a vertical first blade at one end of said fillister plane and a vertical second blade at an opposite end of said fillister plane, said abutment section extending upwardly solidly between said first and second blades;

a knob connected to said valve body, said knob having a connection groove and an expanded groove formed along an interior wall of said knob, said connecting groove connected to said brake axle, said expanded groove having a greater diameter than a diameter of said connecting groove, said expanded groove having a solid abutment member extending radially inwardly for approximately 90° from said interior wall of said knob, said expanded groove concealing said fillister plane when said knob is affixed to said brake axle, said abutment member having a first end surface abutting said first blade when said knob moves rotatably with respect to said valve body in one direction, said abutment member having a second end surface abutting said second blade when said knob moves rotatably with respect to said valve body in an opposite direction, said abutment section and said abutment member and said fillister plane being concealed within said interior wall of said knob.

2. The valve apparatus of claim 1, said abutment section defining a 180° circumferential length between said first and second blades.

* * * * *